United States Patent
Burrows

[11] Patent Number: 6,132,128
[45] Date of Patent: Oct. 17, 2000

[54] SNAP-ON CONTROL MEMBER

[75] Inventor: Bradford J. Burrows, West Olive, Mich.

[73] Assignee: Prince Corporation, Holland, Mich.

[21] Appl. No.: 09/098,999

[22] Filed: Jun. 17, 1998

[51] Int. Cl.[7] .................................................. F16C 11/00
[52] U.S. Cl. ............................ 403/96; 403/154; 403/155
[58] Field of Search ........................ 297/411.26, 411.27, 297/411.28, 411.29, 411.32; 403/155, 154, 94, 93, 96, 103, 91

[56] References Cited

U.S. PATENT DOCUMENTS

| | | |
|---|---|---|
| 2,098,997 | 11/1937 | Bramming . |
| 3,119,591 | 1/1964 | Malecki . |
| 3,570,325 | 3/1971 | Kroll et al. . |
| 3,649,828 | 3/1972 | Price ..................................... 280/43.17 |
| 4,435,011 | 3/1984 | Hakamata ................................ 297/113 |
| 4,614,454 | 9/1986 | Kassai ....................................... 403/62 |
| 4,697,948 | 10/1987 | Fukuda ..................................... 403/71 |
| 4,882,807 | 11/1989 | Frye et al. . |
| 4,951,550 | 8/1990 | Ohki et al. ............................. 91/369.3 |
| 4,953,259 | 9/1990 | Frye et al. . |
| 5,056,868 | 10/1991 | Beck .................................. 297/411.29 |
| 5,116,099 | 5/1992 | Kwasnik et al. . |
| 5,131,785 | 7/1992 | Shimazaki ............................... 403/326 |
| 5,186,569 | 2/1993 | Wu ........................................ 403/154 |
| 5,362,131 | 11/1994 | Susko et al. . |
| 5,518,332 | 5/1996 | Katoh ..................................... 403/155 |
| 5,617,592 | 4/1997 | Cheng ....................................... 5/99.1 |
| 5,669,107 | 9/1997 | Carlsen et al. . |
| 5,740,997 | 4/1998 | Van Wieran ............................. 248/404 |
| 5,752,739 | 5/1998 | Saeki . |
| 5,934,756 | 8/1999 | Smith ................................. 297/411.32 |

FOREIGN PATENT DOCUMENTS

| | | |
|---|---|---|
| 945887 | 4/1974 | Canada . |
| 169533 | 11/1959 | Sweden . |

*Primary Examiner*—Lynne H. Browne
*Assistant Examiner*—Brian Buck
*Attorney, Agent, or Firm*—Harness, Dickey & Pierce, P.L.C.

[57] ABSTRACT

A polymeric torque control is secured to a vehicle armrest and includes an integrally molded coupling surrounding an aperture for receiving and lockably mounting the torque control to a pivot axle extending from a vehicle support member. The integrated coupling is defined by an arcuate slot extending through the torque member in concentric spaced relationship to a pivot axle aperture. A transverse slot in the torque member communicates with the arcuate slot to define a pair of resilient arms having, in the preferred embodiment, outwardly projecting tabs at their free ends extending in a direction orthogonal to the plane of the torque member. Such construction allows a tool, such as a flat-bladed screwdriver, to be easily inserted between the ends of the arcuate arms for deflecting the arms outwardly from the pivot axle, which they surround, to release the armrest from a captive circumferential recess in the pivot axle for removal of the armrest. The armrest is installed by introducing the end of the pivot axle within the aperture, which deflects the arms outwardly to compressively grip the pivot axle and snap into the circumferential recess of the pivot axle when aligned therewith.

21 Claims, 2 Drawing Sheets

SNAP-ON CONTROL MEMBER

BACKGROUND OF THE INVENTION

The present invention relates to a control member which fits on a pivot axle pivotally mounting one member to another and particularly to a torque control for use in connection with a vehicle accessory such as an armrest.

The mounting of vehicle accessories to one another for rotational movement between them typically is achieved utilizing a pivot axle on one member and some form of torque control on the other member, with the two members typically being fastened together utilizing a threaded fastener. In the vehicle armrest area, torque controls, which control the amount of force required for rotation of the armrest so it does not move too freely and which may provide detented locations of the armrest, are disclosed in U.S. Pat. Nos. 4,882,807 and 4,953,259. In each of these patents, a torque control member is disclosed in which a resistance member rides within an arcuate slot upon pivotal motion of the armrest with respect to its support structure to provide a controlled torque for movement of the armrest. The torque control member is mounted to the support structure comprising a U-shaped mounting plate. A resistance member includes a threaded fastener for holding the armrest to the mounting structure.

More recently, armrests have been mounted to pivot axles using snap ring type connectors which are made of spring steel and which extend onto the opposite side of an armrest mounting aperture and engage a peripheral groove near the end of an armrest pivot axle for securing the armrest to the pivot axle. A polymeric torque control similar to that disclosed in the above-identified U.S. patents is employed with such construction and fixedly anchored to the armrest to provide torque control for the movement of the armrest. One difficulty with such mounting of the armrest to the pivot axle is that, once installed, access to the snap ring is difficult and requires a special tool which can, if not used carefully, damage the upholstery of the armrest. Thus, there exists a need for an improved mounting system for an armrest having an integrated torque control and one which is easy to assemble to the pivot axle extending either from the seat or other vehicle support member and which is relatively easily removed if necessary.

SUMMARY OF THE PRESENT INVENTION

In the system of the present invention, a polymeric torque control is secured to the vehicle armrest and includes an integrally molded coupling surrounding an aperture for receiving and lockably mounting the torque control to a pivot axle extending from the vehicle support member. The integrated coupling is defined by an arcuate slot extending through the torque member in concentric spaced relationship to a pivot axle aperture. A transverse slot in the torque member communicates with the arcuate slot to define a pair of resilient arms having, in the preferred embodiment, outwardly projecting tabs at their free ends extending in a direction orthogonal to the plane of the torque member. Such construction allows a tool, such as a flat-bladed screwdriver, to be easily inserted between the ends of the arcuate arms for deflecting the arms outwardly from the pivot axle, which they surround, to release the armrest from a captive circumferential recess in the pivot axle for removal of the armrest. The armrest is installed by introducing the end of the pivot axle within the aperture, which deflects the arms outwardly to compressively grip the pivot axle and snap into the circumferential recess of the pivot axle when aligned therewith.

In a preferred embodiment also, the torque control of the present invention includes apertures for attaching the torque control directly to a side of an armrest and an arcuate frictional surface spaced from said pivot axle aperture for engaging a resistance member of the vehicle support member which rides along the surface to provide a frictional torque for controlling movement of the armrest. A second arcuate slot is formed in said torque member adjacent said frictional surface and allows said frictional surface to deflect. The frictional surface, in a preferred embodiment, terminates in opposite ends in detents engaging the resistance member of the vehicle support member.

Thus, with the present invention, an integrated torque member and attachment member is provided for securing one member to a pivot axle and, in one application, an armrest to a vehicle seat or other support member. The torque member is easily installed and removed, is less expensive than multiple-section torque members and provides improved performance, reliability and ease of removal of the armrest for servicing, if necessary. These and other features, objects and advantages of the present invention will become apparent upon reading the following description thereof together with reference to the accompanying drawings.

DETAILED DESCRIPTION OF THE PREFERRED EMBODIMENT

Figure 1:
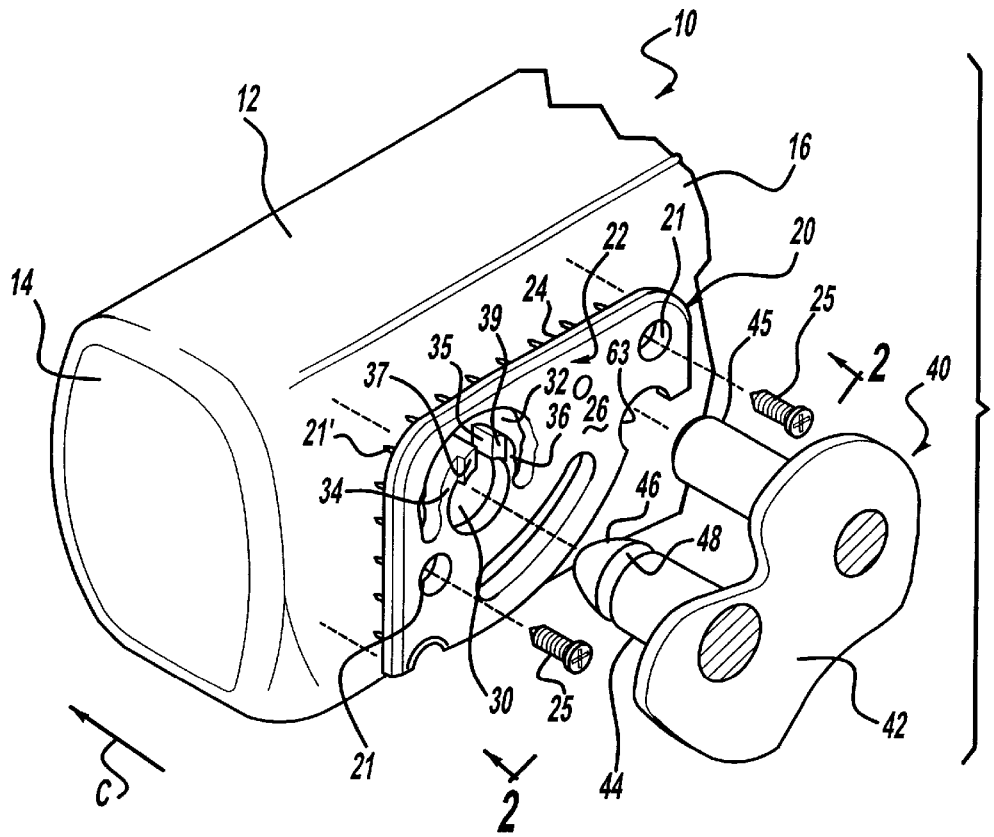
FIG. 1 is a fragmentary exploded perspective view of an armrest, torque member, and support member extending from a vehicle structure.

Referring initially to FIG. 1, there is shown an armrest 10 for a vehicle, such as an automobile, van, sport utility or other type of vehicle, which typically may include armrests which are movable between lowered use positions and raised stored positions. The armrest 10 includes an outer upholstery surface 12, a rear wall 14 and sidewall 16 to which a torque control 20 of the present invention is attached. The forward facing end of the armrest is not shown. The torque control 20 comprises a generally planar body 22 having a first surface 24 facing the side 16 of the armrest 10 near the rear end 14 and an opposite surface 26 facing the mounting structure 40 for the armrest, which structure may extend from a frame 42 of the seat back or may be part of a conventional mounting bracket mounted directly to the vehicle floor.

Figure 2:
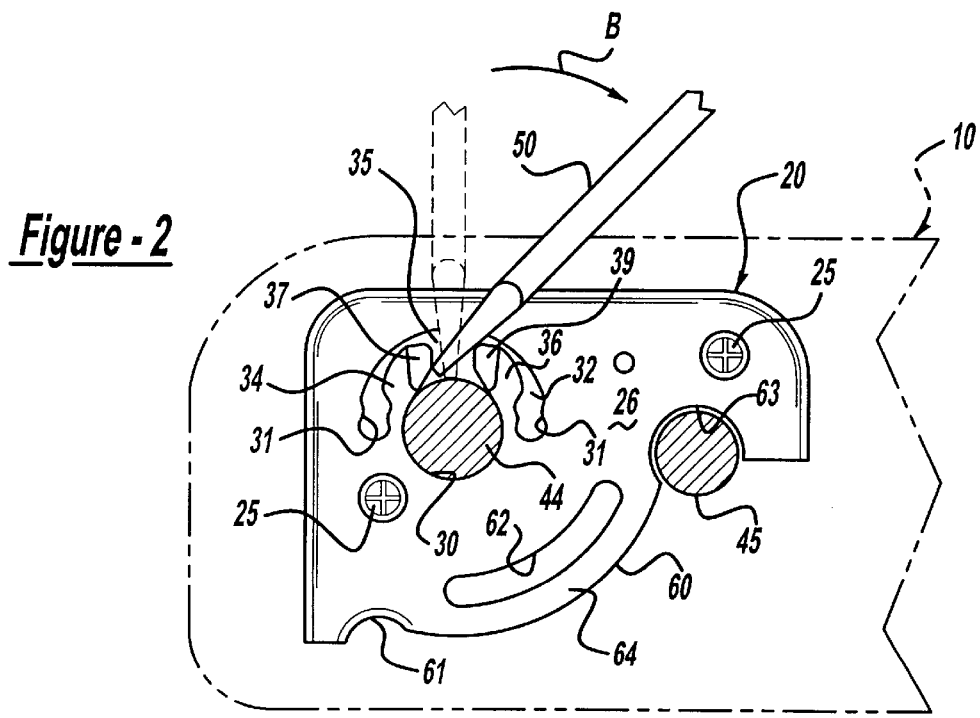
FIG. 2 is a fragmentary end elevational view, partly in cross section, of the armrest shown in a lowered position installed on the pivot axle and follower member and showing the operation for removal of the armrest for servicing.

Support member 40 includes a pivot axle 44 having a tapered end 46 and a circumferential recess 48 spaced inwardly from end 46 to allow the snap mounting of armrest 10 to support member 40 as described in greater detail below. Support member 40 also includes a torque follower or resistance member 45 also comprising a rod-shaped member extending in spaced relationship to pivot axle 44 and which cooperates with the torque member 20 as described below in connection with FIGS. 2–4. Torque member 20 is made of a suitable polymeric material, such as Celcon®, polycarbonate, resin-filled polypropylene or other suitable polymeric material, with sufficient strength and rigidity to support the armrest on the pivot axle 44 and react with the resistance member 45. The material is selected to provide a thermally and environmentally stable material for such purpose.

Torque member 20 includes a plurality of upholstery capturing pins 21' extending toward surface side 16 of armrest 10 away from first surface 24 of the planar torque member, as seen in FIG. 1. The torque member is mounted to a polymeric or other core of the armrest by threaded fasteners 25 extending through apertures 21 in the torque member for securely anchoring the torque member to side 16 of armrest 10. Torque member 20 includes a pivot axle receiving aperture 30 surrounded in spaced concentric relationship by an arcuate slot 32, which circumscribes an arc of approximately 180° surrounding the pivot axle receiving aperture 30 and having ends which may be enlarged at 31. A transverse slot 35 extends between aperture 30 and slot 32 defining a pair of resilient arcuate arms 34 and 36. Arcuate arms 34 and 36, which are integrally formed, resiliently can move toward and away from each other. Apertures 31 add additional resiliency to these arms. The ends of arcuate arms 34 and 36 include tabs 37 and 39, respectively, which project in a plane orthogonal to the plane of the torque member 20 and toward mounting member 40, as best seen in FIG. 1. The tabs provide facing surfaces for receiving a tool 50, such as a flat-bladed screwdriver, which can be positioned between the tabs for spreading arms 34, 36 apart for removal of the armrest once installed as described in greater detail below.

Figure 3:
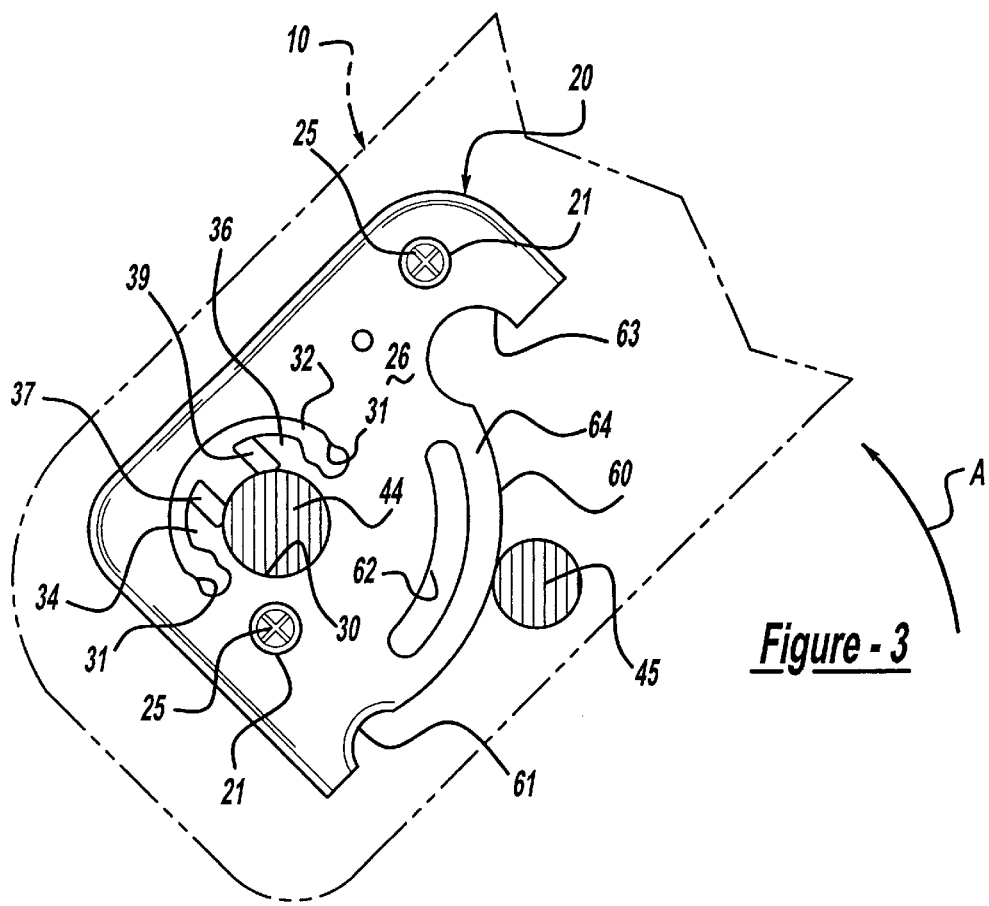
FIG. 3 is an end elevational view illustrating the relationship of the armrest and torque control as the armrest is moved in an upward direction.
Figure 4:
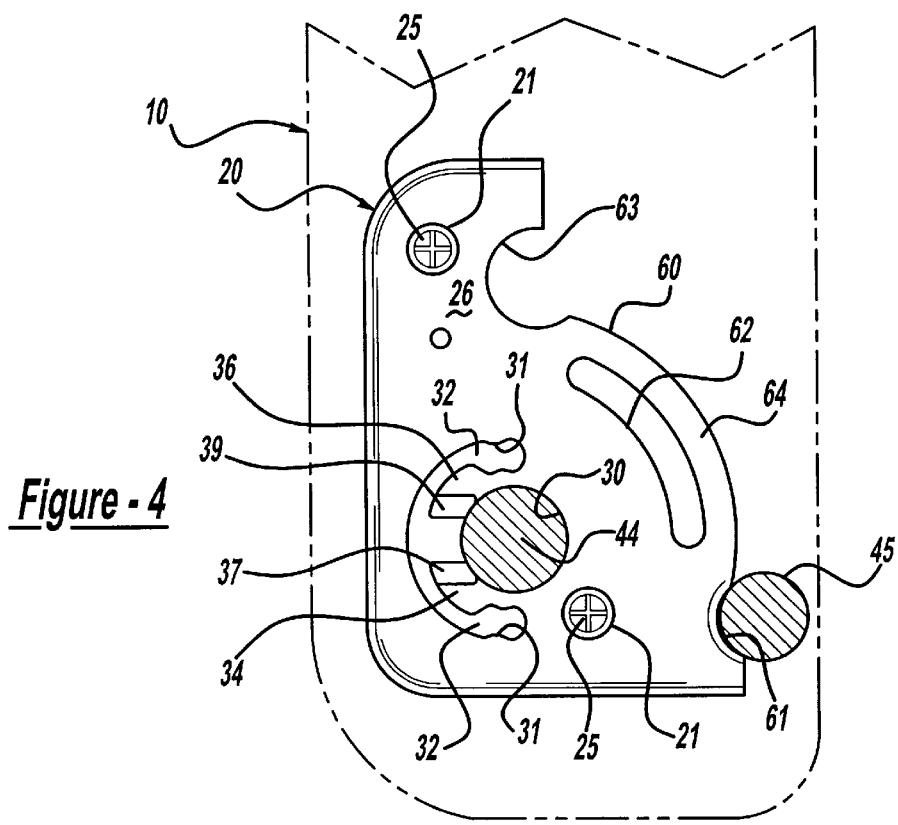
FIG. 4 is an end elevational view of the structure shown in FIG. 3, shown with the armrest in a raised stored position.

Torque member 20 further includes an arcuate outer frictional surface 60. Resistance member 45 rides along surface 60. The resiliency of surface 60 is improved by providing an arcuate slot 62 in spaced relationship to surface 60 to allow the leg 64 defined thereby to deflect upon engagement by follower member 45, as seen in FIG. 3. Torque member 20 further includes a pair of detents 61, 63 defining the raised stored position and lowered use position of the armrest 10, respectively. The armrest and torque member are installed on the support member 40 by inserting the blunt or tapered end 46 of pivot rod 44 into aperture 30 with the tapered end 46 spreading arms 34, 36 apart sufficiently to allow the pivot rod 44 to be extended within the armrest until the arms 34, 36 snap-fit within the circumferential recess 48 of pivot rod 44. The width of recess 48 is selected to be slightly greater than the thickness of arms 34, 36, such that the arms fit within the recess without excessive movement of the armrest along the longitudinal axis of pivot rod 44. Depending on the size and weight of the armrest, the recess 48 may be positioned along the pivot axle 44 at a desired selected axial location to provide sufficient strength for the mounting of the armrest to the pivot rod. The arms 34, 36, once snapped into position in recess 48, position the follower 45 preferably within the first stop 63 of the torque member and subsequently, upon raising the armrest in a direction indicated by arrow A in FIG. 3, the follower 45 rides along the frictional surface 60 compressing leg 64, as seen in FIG. 3, against the arcuate slot 62 to provide a controlled torque for movement of the armrest 10. When the armrest is in its vertical stored position as shown in FIG. 4, the follower 45 seats in the second aperture 61 which forms a detent to hold the armrest in the raised stored position.

If it becomes necessary to remove the armrest from the support member 40, a tool 50, such as a flat-bladed screwdriver, is inserted between the laterally projecting tabs 37, 39 of arms 34, 36. Moving the tool in a direction indicated by arrow B in FIG. 2 spreads the arms 34, 36 apart sufficiently to release them from circumferential recess 48, thereby allowing removal of the armrest from the support member 40 by moving the armrest in the direction indicated by arrow C in FIG. 1.

Thus, with the system of the present invention, a torque control is provided which serves not only as a torque control member for an armrest with respect to a vehicle seat or other members but also provides mounting structure for securing one member onto the pivot axle of a support member. In some embodiments, the mounting of the parts may be reversed. It will become apparent to those skilled in the art that various modifications to the preferred embodiment of the invention as described herein can be made without departing from the spirit or scope of the invention as defined by the appended claims.

The invention claimed is:

1. A torque control for use with a component pivotally mounted to a support structure, said torque control adapted for pivotal movement about a pivot pin having a retainer recess and adapted to be fixedly mounted to one of the component and the support structure, said torque control comprising:

a resilient polymeric member for attachment to one of the other of the component and the support structure, said member having an integral mounting clip comprising an aperture surrounded by a pair of deflectable arcuate arms having a thickness adapted to allow positioning within the retainer recess of the pivot pin, said pair of deflectable arcuate arms adapted to lock said member onto the pivot pin when the pivot pin is extended through said aperture; and said member including at least one arcuate surface spaced from said aperture.

2. The torque control as defined in claim 1 wherein said deflectable arms are defined by an arcuate slot partially surrounding said aperture and a transverse slot extending between said aperture and said arcuate slot.

3. The torque control as defined in claim 2 wherein said arcuate arms have ends which are spaced apart and define respective edges of said transverse slot.

4. The torque control as defined in claim 3 wherein said ends of said arcuate arms each include a tab extending in a direction orthogonal to a plane of said torque control.

5. The torque control as defined in claim 4 wherein said torque control includes a generally planar body having one side facing a component and apertures formed through said body for receiving fasteners for attaching said torque control to said component.

6. The torque control as defined in claim 5 wherein said component is upholstered and said one side of said torque control integrally includes upholstery retaining pins projecting therefrom.

7. A control member extending between a movable vehicle component and a fixed support coupled by a pivot pin permitting rotation of said component between different positions, said control member comprising:

a polymeric body having an arcuate slot formed through said body and extending through an arc of about 180°, an aperture formed through said body at a location generally concentric with and partially circumscribed by said arcuate slot, a slot extending between said arcuate slot and said aperture for defining a pair of arcuate arms located between said aperture and said arcuate slot, said arms resiliently deflectable thereby allowing said control member to be mounted to the pivot pin with said arcuate arms engaging the pivot pin.

8. The control member as defined in claim 7 wherein said arcuate arms have ends which are spaced apart and define respective edges of said transverse slot.

9. The control member as defined in claim 8 wherein said ends of said arcuate arms each include a tab extending in a direction orthogonal to a plane of said torque control.

10. The control member as defined in claim 9 wherein said torque control includes a generally planar body having one side facing a component and apertures formed through said body for receiving fasteners for attaching said torque control to said component.

11. The control member as defined in claim 10 wherein said component is upholstered and said one side of said torque control integrally includes upholstery retaining pins projecting therefrom.

12. A torque control for a vehicle armrest pivotally mounted to a seat, said torque control adapted for pivotal movement about a pivot pin having a retainer recess fixedly mounted to one of the armrest and the seat, said torque control comprising:

a resilient polymeric member for attachment to one of the other of the armrest and the seat, said member having an aperture at least partially surrounded by a pair of deflectable arcuate arms adapted for positioning within the retainer recess of the pivot pin to lock said member onto the pivot pin when the pivot pin is extended through said aperture.

13. The torque control as defined in claim 12 wherein said deflectable arms are defined by an arcuate slot partially surrounding said aperture and a transverse slot extending between said aperture and said arcuate slot.

14. The torque control as defined in claim 13 wherein said arcuate arms have ends which are spaced apart and define respective edges of said transverse slot.

15. The torque control as defined in claim 14 wherein said ends of said arcuate arms each include a tab extending in a direction orthogonal to a plane of said torque control.

16. The torque control as defined in claim 15 wherein said torque control includes a generally planar body having one side facing the armrest and apertures formed through said body for receiving fasteners for attaching said torque control to the armrest.

17. The torque control as defined in claim 16 wherein the armrest is upholstered and said one side of said torque control integrally includes upholstery retaining pins projecting therefrom.

18. A control member extending between a vehicle armrest and a fixed support coupled by a pivot pin for permitting rotation of said armrest between different positions, said control member comprising:

a polymeric body having an arcuate slot formed through said body and extending through an arc of about 180°, an aperture formed through said body at a location generally concentric with and partially circumscribed by said arcuate slot, a transverse slot extending between said arcuate slot and said aperture for defining a pair of arcuate arms located between said aperture and said arcuate slot, said arms resiliently deflectable thereby allowing said control member to be mounted to the pivot pin with said arcuate arms engaging the pivot pin.

19. The control member as defined in claim 18 wherein said arcuate arms have ends which are spaced apart and define respective edges of said transverse slot.

20. The control member as defined in claim 19 wherein said ends of said arcuate arms each include a tab extending in a direction orthogonal to a plane of said torque control.

21. The control member as defined in claim 20 wherein said member includes at least one arcuate surface spaced from said aperture for engaging a resistance element as the armrest pivots about the pivot pin.

* * * * *